(12) United States Patent
Hamane et al.

(10) Patent No.: US 9,399,960 B2
(45) Date of Patent: Jul. 26, 2016

(54) ROAD SURFACE SLOPE ESTIMATING DEVICE AND ENGINE CONTROL APPARATUS

(71) Applicant: Nissan Motor Co., Ltd., Yokohama-shi, Kanagawa (JP)

(72) Inventors: Shouta Hamane, Chigasaki (JP); Takashi Matsuda, Isehara (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 779 days.

(21) Appl. No.: 13/792,539

(22) Filed: Mar. 11, 2013

(65) Prior Publication Data

US 2013/0261931 A1  Oct. 3, 2013

(30) Foreign Application Priority Data

Mar. 13, 2012 (JP) ................. 2012-055210

(51) Int. Cl.
*G06F 17/00* (2006.01)
*F02D 29/02* (2006.01)
*F02N 11/08* (2006.01)

(52) U.S. Cl.
CPC ............ *F02D 29/02* (2013.01); *F02N 11/0837* (2013.01); *F02N 2200/124* (2013.01); *Y02T 10/48* (2013.01)

(58) Field of Classification Search
CPC ............ F02D 35/0092; F02D 35/0046; F02D 35/0023; F02D 35/00; F02D 31/007; F02D 31/00; F02D 31/009; F02D 31/008; F02D 31/006; F02N 11/00; F02N 11/08; F02N 11/0803; F02N 11/0818; F02N 11/0814; F02N 11/0833; F02N 11/0837; F02N 11/0801; F02N 11/0802; F02N 11/0805; B60T 8/172; B60T 8/173; B60T 8/1763; B60T 8/14; B60T 8/18; B60T 8/24; B60T 8/245; B60T 2210/00; B60T 2210/10; B60T 2210/12; B60W 2550/00; B60W 2550/14; B60W 2550/141; B60W 2550/142; B60W 2550/147; B60W 10/04; B60W 10/06; B60W 10/182; B60K 28/00; B60K 28/003; B60K 28/10; B60K 28/14

See application file for complete search history.

(56) References Cited

U.S. PATENT DOCUMENTS

| 6,249,735 B1 * | 6/2001 | Yamada | .................. B60T 8/18 |
| | | | 701/65 |
| 6,522,968 B1 * | 2/2003 | Ito | ......................... B60T 8/172 |
| | | | 180/197 |

(Continued)

FOREIGN PATENT DOCUMENTS

| JP | 2004045423 A | 2/2004 |
| JP | 2007212972 A | 8/2007 |

(Continued)

*Primary Examiner* — Thomas Tarcza
*Assistant Examiner* — Edward J Pipala
(74) *Attorney, Agent, or Firm* — Young Basile Hanlon & MacFarlane, P.C.

(57) ABSTRACT

A road surface slope estimating device includes a forward/backward sensor that outputs a detected forward/backward of a vehicle, a forward/backward estimator that calculates an estimated forward/backward of the vehicle, and a road surface slope estimating device that calculates an estimated road surface slope value using the detected forward/backward and the estimated forward/backward. The road surface slope estimating device implements a momentarily rough terrain determination step to determine whether the vehicle is traveling on momentarily rough terrain or continuously rough terrain. When it is determined that the vehicle is traveling on momentarily rough terrain, the road surface slope estimating device fixes the estimated road surface slope value to an estimated road surface slope value obtained immediately before the determination is made.

9 Claims, 5 Drawing Sheets

(56) References Cited

U.S. PATENT DOCUMENTS

| | | | |
|---|---|---|---|
| 2002/0008423 A1* | 1/2002 | Yasui | B60T 8/1766 303/9.62 |
| 2002/0055810 A1* | 5/2002 | Nakasako | B60K 6/48 701/22 |
| 2009/0240411 A1* | 9/2009 | Amamiya | B60W 30/18063 701/70 |

FOREIGN PATENT DOCUMENTS

| | | |
|---|---|---|
| JP | 2010151096 A | 7/2010 |
| JP | 2011237004 A | 11/2011 |

* cited by examiner

ROAD SURFACE SLOPE ESTIMATING DEVICE AND ENGINE CONTROL APPARATUS

CROSS REFERENCE TO RELATED APPLICATIONS

This claims priority under 35 U.S.C. §119 to Japanese Patent Application No. 2012-055210. The entire disclosure of Japanese Patent Application No. 2012-055210 is hereby incorporated herein by reference.

TECHNICAL FIELD

The present invention relates to a road surface slope estimating device and an engine control apparatus.

BACKGROUND

Technologies for engine control apparatuses for automatically stopping an engine of a vehicle during deceleration before the vehicle completely stops in order to enhance fuel economy are available. In such technologies, the slope of a road surface on which the vehicle is travelling is estimated to determine whether it is possible or not to automatically stop the engine in order to prevent the vehicle from rolling down a hill.

One method for determining an estimated value of the slope of the road surface on which the vehicle is traveling is disclosed in Japanese Unexamined Patent Application Publication No. 60-70307. In the disclosed method, a forward/backward acceleration estimated based on a wheel speed of the vehicle, which is obtained from a wheel speed sensor, is subtracted from a forward/backward acceleration of the vehicle, which is detected by an acceleration sensor.

In the technologies of the related art, because momentarily rough terrain (a road with obstacles such as foreign objects on the road such as stones, branches, and pieces of wood, and exposed manholes) on which the vehicle is traveling may have instantaneous changes in road surface µ, values detected by the acceleration sensor and the wheel speed sensor may temporarily largely vary.

For this reason, the estimated road surface slope value may largely deviate from the actual value, and the engine may be prohibited from being automatically stopped even on a road surface with a slope on which automatic stopping of the engine would actually be allowed. Thus, a problem arises in that fuel economy may deteriorate.

BRIEF SUMMARY

The present invention provides a road surface slope estimating device and an engine control apparatus, which are configured to suppress or reduce incorrect estimation of road surface slope caused by a vehicle passing through momentarily rough terrain.

In an aspect of the present invention, if it is determined that a vehicle is traveling on momentarily rough terrain, an estimated road surface slope value with reduced influence of the vehicle passing through the momentarily rough terrain is calculated.

According to the present invention, therefore, since an estimated road surface slope value with reduced influence of a vehicle passing through momentarily rough terrain is calculated, incorrect estimation of road surface slope caused by the vehicle passing through momentarily rough terrain may be suppressed or reduced.

BRIEF DESCRIPTION OF THE DRAWINGS

The description herein makes reference to the accompanying drawings wherein like reference numerals refer to like parts throughout the several views, and wherein.

DETAILED DESCRIPTION

A road surface slope estimating device and an engine control apparatus according to embodiments of the present invention will be described hereinafter with reference to the drawings.

First, a configuration according to a first embodiment will be described.

Figure 1:
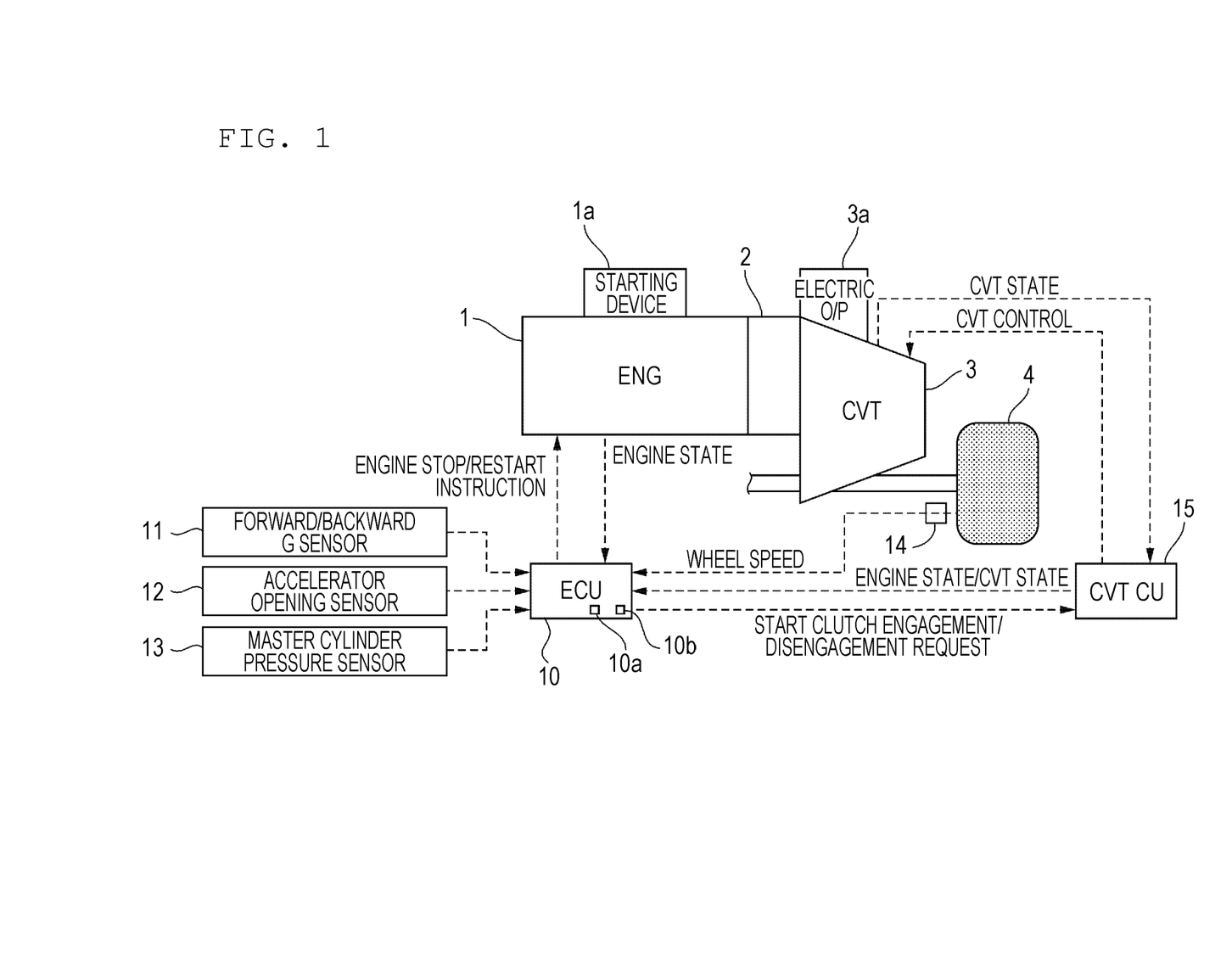
FIG. 1 is a system diagram illustrating an engine control apparatus according to a first embodiment.

FIG. 1 is a system diagram illustrating an engine control apparatus according to the first embodiment. A rotational drive force input from an engine 1 is input to a belt continuously variable transmission (CVT) 3 through a torque converter 2, and is transmitted to drive wheels 4 after the speed of the rotational drive force has been changed with a desired transmission gear ratio.

The engine 1 includes a starting device 1a that initiates an engine start process. Specifically, the engine 1 is equipped with a starter motor, with which engine cranking is performed in accordance with an engine start instruction and fuel is injected into the engine 1. When the engine 1 becomes rotating in a self-sustaining manner, the starter motor is stopped.

The torque converter 2 is provided on the output side of the engine 1. The torque converter 2 includes a lock-up clutch to amplify the torque at parking speeds and to prohibit relative rotation at speeds greater than or equal to a certain vehicle speed (for example, appropriately 14 km/h). The belt CVT 3 is connected to the output side of the torque converter 2.

The belt CVT 3 includes a start clutch, a primary pulley, a secondary pulley, and a belt stretched across the pulleys, and the groove widths of the pulleys are changed by hydraulic control to achieve a desired transmission gear ratio. The belt CVT 3 further includes an oil pump driven by the engine 1. When the engine 1 is activated, a converter pressure and lock-up clutch pressure of the torque converter 2 are supplied from the oil pump serving as a hydraulic pressure source, and a pulley pressure and clutch engagement pressure of the belt CVT 3 are further supplied.

The belt CVT 3 further includes an electric oil pump 3a. When it is difficult to supply a hydraulic pressure using the oil pump because the engine 1 has been automatically stopped, the electric oil pump 3a is activated to enable necessary hydraulic pressures to be supplied to the individual actuators. Thus, even while the engine 1 is not running, the desired transmission gear ratio may be achieved, and the clutch engagement pressure may be maintained.

The operation state of the engine 1 is controlled by an engine control unit (automatic stop and restart control means)

10. The engine control unit 10 receives a forward/backward G signal input from a forward/backward G sensor (acceleration detecting means) 11 that detects the forward/backward acceleration of the vehicle, an accelerator signal input from an accelerator opening sensor 12 that detects the amount of accelerator pedal (or gas pedal) operation by a driver who drives the vehicle, a braking operation amount signal (master cylinder pressure) input from a master cylinder pressure sensor 13 that detects a master cylinder pressure generated in accordance with the amount of braking operation, wheel speed signals input from wheel speed sensors 14 provided on the individual wheels, a CVT state signal input from a CVT control unit 15 described below, and signals indicating an engine coolant temperature, a crank angle, an engine rotational speed, and so forth. The engine control unit 10 causes the engine 1 to start or automatically stop in accordance with the various signals described above. The master cylinder pressure sensor 13A may be replaced by a pedal force sensor that detects the brake pedal stroke amount or the brake pedal force, a sensor that detects the wheel cylinder pressure, or the like to detect the amount of operation of the brake pedal.

The CVT control unit 15 transmits and receives the signals of the engine operation state and CVT state to and from the engine control unit 10, and controls the transmission gear ratio and the like of the belt CVT in accordance with the signals. Specifically, when the driving range is selected, the CVT control unit 15 engages the start clutch, determines a transmission gear ratio from a transmission gear ratio map in accordance with the accelerator pedal opening and the vehicle speed, and controls the individual pulley hydraulic pressures. Further, the CVT control unit 15 disengages the lock-up clutch when the vehicle speed is less than a certain vehicle speed, and engages the lock-up clutch to directly connect the engine 1 and the belt CVT 3 when the vehicle speed is greater than or equal to the certain vehicle speed. In addition, while the driving range is selected and the engine 1 is automatically stopped, the CVT control unit 15 causes the electric oil pump 3a to operate to reserve the necessary hydraulic pressure. The CVT control unit 15 engages and disengages the start clutch in accordance with a start clutch engagement/disengagement request sent from the engine control unit 10.

In the first embodiment, when the vehicle is decelerating even during traveling and presumably will stop, coast stop control for stopping the engine 1 is performed.

The coast stop control is initiated when all the following five conditions are met, and is terminated when any one of the following five conditions is not met:

(1) The amount of braking operation is greater than or equal to a certain amount.

(2) The amount of accelerator pedal operation is zero.

(3) The driving range is selected.

(4) The vehicle speed is less than or equal to a reference vehicle speed (vehicle speed at which the lock-up clutch is disengaged).

(5) The road surface slope is less than or equal to a coast stop allowable slope (certain degree of slope).

Even though all the five conditions given above are met, the engine control unit 10 sets a coast stop control prohibition flag when the vehicle is traveling on rough terrain (such as gravel or grass), and prohibits or cancels the coast stop control as long as the prohibition flag is set. The prohibition flag is reset when the vehicle exits the rough terrain.

The engine control unit 10 includes a forward/backward G estimator (acceleration detecting means) 10a that estimates the forward/backward G, or G force, of the vehicle, and a road surface slope estimating device (road surface slope estimating means) 10b configured to detect a road surface slope and rough terrain.

The forward/backward G estimator 10a receives the forward/backward G (detected forward/backward G) detected by the forward/backward G sensor 11 and the wheel speeds detected by the individual wheel speed sensors 14, calculates a vehicle speed from the wheel speeds, and differentiates the vehicle speed to determine an estimated value of the forward/backward acceleration (estimated forward/backward G).

The road surface slope estimating device 10b subtracts the estimated forward/backward G from the detected forward/backward G, and outputs the resulting calculated value as an estimated road surface slope value.

Here, when the vehicle is traveling on momentarily rough terrain (a road with obstacles such as foreign objects on the road such as stones, branches, and pieces of wood, and exposed manholes), values detected by the forward/backward G sensor 11 and the wheel speed sensor 14 may temporarily largely vary due to the instantaneous changes in the road surface μ of the momentarily rough terrain. In this case, an estimated road surface slope value determined using the detected forward/backward G and the estimated forward/backward G may largely deviate from the actual value. Since the calculated estimated road surface slope value exceeds the coast stop allowable slope although the actual slope of the road surface is less than or equal to the coast stop allowable slope, the coast stop control is canceled, which may impair fuel economy.

In the first embodiment, therefore, in order to suppress, or at least reduce, incorrect estimation of road surface slope caused by a vehicle passing through momentarily rough terrain, a road surface slope estimation process described hereinafter is implemented.

Figure 2:
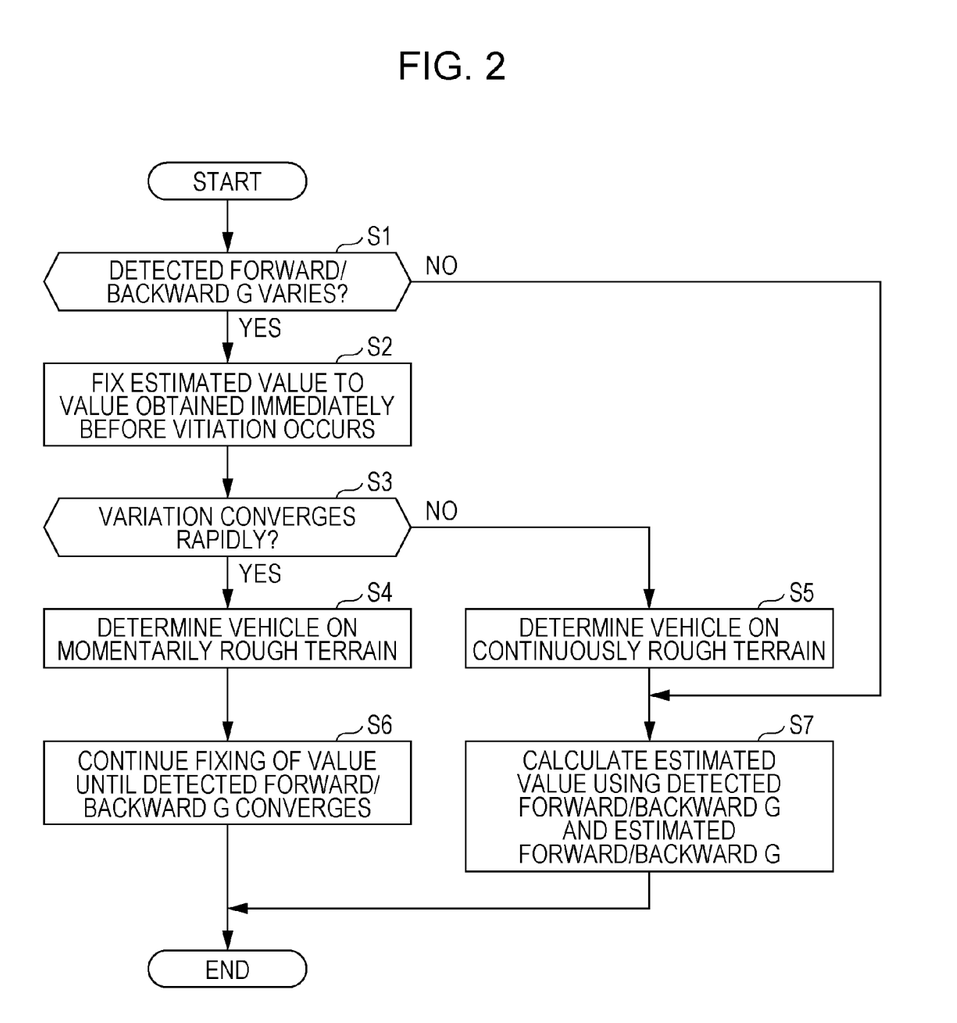
FIG. 2 is a flowchart illustrating a procedure of a road surface slope estimation process executed by a road surface slope estimating device according to the first embodiment.

FIG. 2 is a flowchart illustrating a procedure of a road surface slope estimation process executed by the road surface slope estimating device 10b according to the first embodiment. Individual steps will be described.

In step S1, it is determined whether or not the detected forward/backward G varies. If "YES" is determined, the process proceeds to step S2 whereas if "NO" is determined, then the process proceeds to step S7. Here, it is determined that the detected forward/backward G varies when the range of variation in the detected forward/backward G per unit time exceeds a certain range.

In step S2, the estimated road surface slope value is fixed to (or held at) a value calculated using the detected forward/backward G and the estimated forward/backward G immediately before the detected forward/backward G varies.

In step S3, it is determined whether or not the variation converges rapidly. If "YES" is determined, the process proceeds to step S4 whereas if "NO" is determined, the process proceeds to step S5. Here, it is determined that the variation converges rapidly when the rate of decay of the detected forward/backward G in a certain convergence determination period (in terms of time or travel distance) is greater than or equal to a certain value. Step S3 is a momentarily rough terrain determining means.

In step S4, it is determined that the vehicle is on momentarily rough terrain.

In step S5, it is determined that the vehicle is on continuously rough terrain (such as gravel or grass, or a normal rough terrain).

In step S6, the holding of the estimated road surface slope value at the value in step S2 continues until the detected forward/backward G converges.

In step S7, a value obtained by subtracting the estimated forward/backward G from the detected forward/backward G is used as the estimated road surface slope value.

Figure 3A:
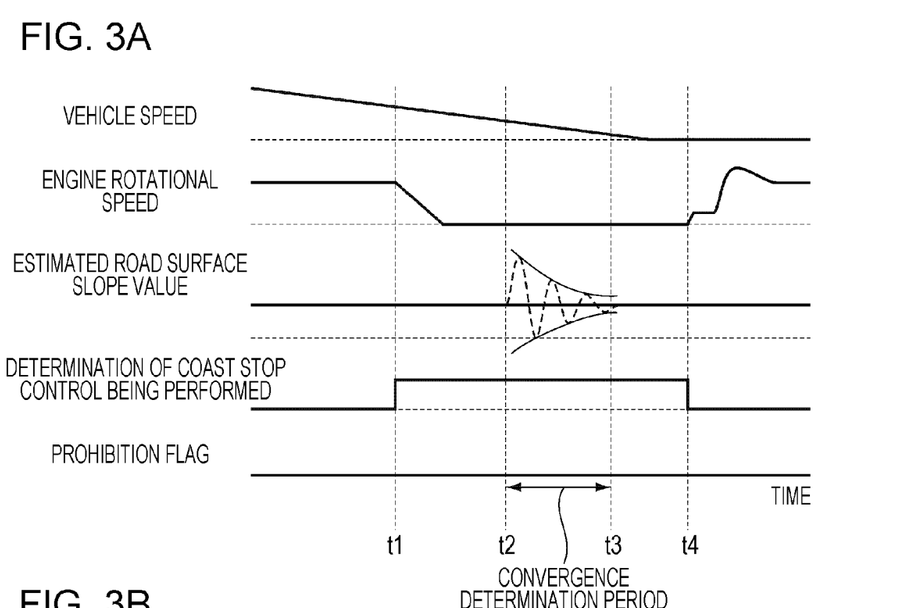
FIGS. 3A and 3B are time charts illustrating the operation of estimating a road surface slope according to the first embodiment.
Figure 3B:
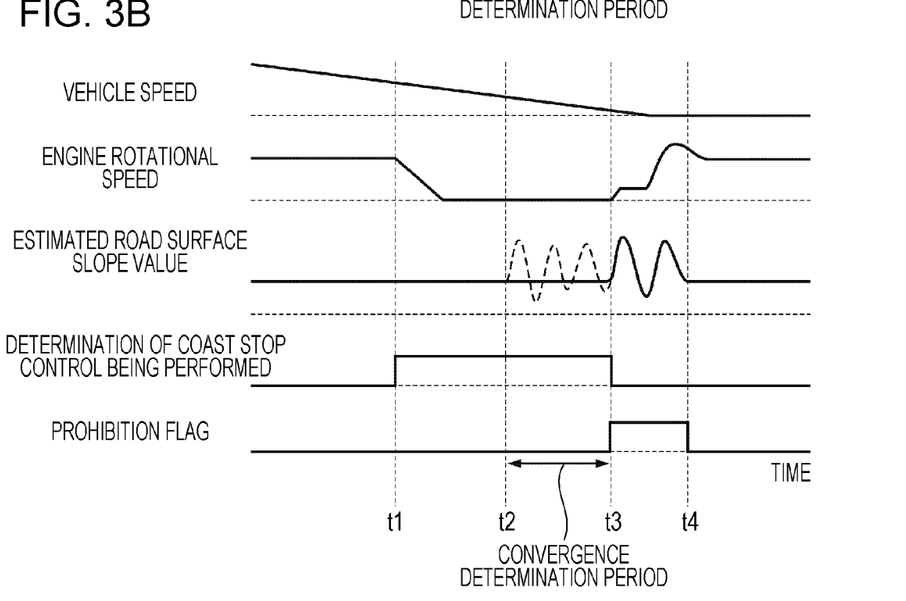

FIGS. 3A and 3B are time charts illustrating the operation of estimating a road surface slope according to the first embodiment. FIG. 3A illustrates the time chart in a case where the vehicle is traveling on momentarily rough terrain, and FIG. 3B illustrates the time chart in a case where the vehicle is traveling on rough terrain (continuously rough terrain).

First, the case illustrated in FIG. 3A will be described. At time t1, the conditions for initiating the coast stop control are met. Thus, it is determined that coast stop control is to be performed, and the engine 1 is automatically stopped. At time t2, the vehicle is passing through momentarily rough terrain.

During a period from time t2 to time t3, the detected forward/backward G largely varies because the vehicle is passing through the momentarily rough terrain. Thus, the value obtained by subtracting the estimated forward/backward G from the detected forward/backward G oscillates in a manner indicated by a broken line while the estimated road surface slope value is fixed to a value obtained immediately before the variation occurs, that is, the value obtained at time t2. Therefore, the coast stop control is not canceled and automatic stopping of the engine 1 is continued. Therefore, a reduction in fuel economy due to incorrect estimation of road surface slope caused by the vehicle passing through the momentarily rough terrain may be suppressed.

At time t3, the rate of decay of the estimated road surface slope value in the certain convergence determination period (from t2 to t3) is greater than or equal to the certain value. Thus, it is determined that the vehicle is on momentarily rough terrain. Also, the detected forward/backward G converges. Therefore, the fixing of the estimated road surface slope value is released.

At time t4, the driver of the vehicle releases his or her foot from the brake pedal. Thus, the coast stop control is canceled, and the engine 1 is restarted.

The case illustrated in FIG. 3B will now be described. The operation in the period from time t1 to time t2 is substantially the same as that illustrated in FIG. 3A, and a description thereof is thus omitted. At time t2, the vehicle enters rough terrain.

During the period from time t2 to time t3, the detected forward/backward G largely varies because the vehicle is moving on the rough terrain. Thus, the value obtained by subtracting the estimated forward/backward G from the detected forward/backward G oscillates, while the estimated road surface slope value is fixed to a value obtained immediately before the variation occurs, that is, the value obtained at time t2. Therefore, the coast stop control is not canceled and automatic stopping of the engine 1 is continued.

At time t3, the rate of decay of the estimated road surface slope value in the certain convergence determination period (from t2 to t3) is less than the certain value. Thus, it is determined that the vehicle is on continuously rough terrain. Therefore, the fixing of the estimated road surface slope value is released, and a value obtained by subtracting the estimated forward/backward G from the detected forward/backward G is used as the estimated road surface slope value. Furthermore, since it is determined that the vehicle is on continuously rough terrain, the coast stop control prohibition flag is set. Therefore, the coast stop control is canceled, and the engine 1 is restarted.

While the vehicle is traveling on rough terrain, the precision for the estimation of road surface slope may be markedly low. In addition, the road surface μ may be presumably lower than the surface of paved terrain. If the coast stop control is performed, the vehicle may roll down the slope. Furthermore, the estimated road surface slope value varies over the coast stop allowable slope, resulting in a risk that control hunting may occur. By prohibiting the coast stop control when the vehicle is traveling on rough terrain, it may be possible to prevent the vehicle from rolling down a hill and control hunting from occurring.

At time t4, the estimated road surface slope value converges. Thus, the coast stop control prohibition flag is reset.

The first embodiment may achieve the following advantages:

(1) A road surface slope estimating device including a forward/backward G sensor 11 that outputs a detected forward/backward G of a vehicle, a forward/backward G estimator 10a that calculates an estimated forward/backward G of the vehicle, and an road surface slope estimating device 10b that calculates an estimated road surface slope value using the detected forward/backward G and the estimated forward/backward G includes a momentarily rough terrain determining means (S3) for determining whether the vehicle is traveling on momentarily rough terrain or continuously rough terrain, and when it is determined that the vehicle is traveling on momentarily rough terrain, the road surface slope estimating device 10b fixes the estimated road surface slope value to an estimated road surface slope value obtained immediately before the determination is made. Therefore, incorrect estimation of road surface slope caused by the vehicle passing through the momentarily rough terrain may be suppressed or at least reduced.

(2) The momentarily rough terrain determining means determines whether the vehicle is traveling on momentarily rough terrain or continuously rough terrain, based on convergence of the detected forward/backward G (the rate of decay in a convergence determination period). The waveform of the detected forward/backward G constantly oscillates when the vehicle is traveling on rough terrain, whereas, when the vehicle is passing through momentarily rough terrain, the waveform of the detected forward/backward G starts to decay immediately after the vehicle has passed through the momentarily rough terrain, and converges. Therefore, the convergence of the detected forward/backward G may be observed to accurately identify the vehicle passing through momentarily rough terrain and the vehicle traveling on normal rough terrain (continuously rough terrain).

(3) An engine control apparatus including an engine control unit 10 that causes an engine 1 of a vehicle to automatically stop when certain initiation conditions including the condition that a slope of a road surface is less than or equal to a coast stop allowable slope when the vehicle is coasting are met, and thereafter causes the engine 1 to restart when certain termination conditions including the condition that a slope of the road surface is larger than the coast stop allowable slope are met determines whether it is possible or not to execute coast stop control, based on the estimated road surface slope value obtained by the road surface slope estimating device 10b. Since the coast stop control is not prohibited or canceled even when the vehicle is traveling on momentarily rough terrain, a reduction in fuel economy due to incorrect estimation of road surface slope may be suppressed.

(4) When it is determined that the vehicle is traveling on continuously rough terrain, the engine control unit 10 prohibits automatic stopping of the engine 1 even if the initiation conditions are met. Therefore, the vehicle may be prevented from rolling down a hill or the occurrence of control hunting may be prevented when the vehicle is traveling on rough terrain.

A second embodiment provides an example of an application to the idle-stop, or stop-start, technology. Differences from the first embodiment will be described.

In the second embodiment, the engine control unit (automatic stop and restart control means) 10 performs stop-start control to stop the engine 1 when the vehicle is at a standstill.

The stop-start control is initiated when all the following five conditions are met, and is terminated when any one of the following five conditions is not met:

(1) The amount of braking operation is greater than or equal to a certain amount.

(2) The amount of accelerator pedal operation is zero.

(3) The driving range is selected.

(4) The vehicle speed is zero.

(5) All the slopes of the road surface on which the vehicle travels immediately before the vehicle completely stops and then the vehicle is at rest are less than or equal to a stop-start allowable slope (certain degree of slope).

Even though all the five conditions given above are met, the engine control unit 10 sets a stop-start control prohibition flag when the vehicle is traveling on rough terrain (such as gravel or grass), and prohibits or cancels the stop-start control as long as the prohibition flag is set. The prohibition flag is reset when the vehicle exits the rough terrain.

Figure 4A:
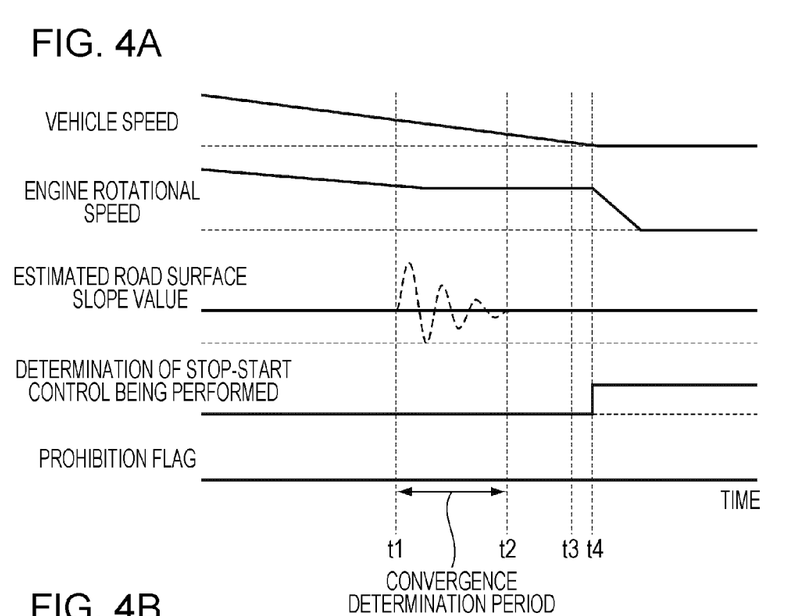
FIGS. 4A and 4B are time charts illustrating the operation of estimating a road surface slope according to a second embodiment.
Figure 4B:
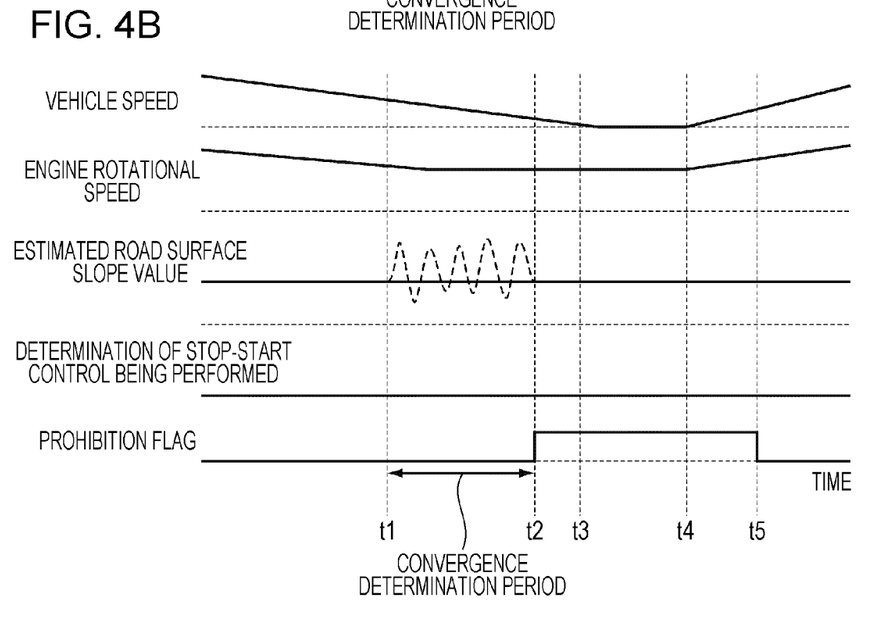

FIGS. 4A and 4B are time charts illustrating the operation of estimating a road surface slope according to the second embodiment. FIG. 4A illustrates the time chart in a case where the vehicle is traveling on momentarily rough terrain, and FIG. 4B illustrates the time chart in a case where the vehicle is traveling on rough terrain.

First, the case illustrated in FIG. 4A will be described. At time t1, the vehicle is passing through momentarily rough terrain.

During a period from time t1 to t2, the detected forward/backward G largely varies because the vehicle is passing through the momentarily rough terrain. Thus, the value obtained by subtracting the estimated forward/backward G from the detected forward/backward G oscillates in a manner indicated by a broken line while the estimated road surface slope value is fixed to a value obtained immediately before the variation occurs, that is, the value obtained at time t2. Therefore, the stop-start control prohibition flag is not set.

At time t2, the rate of decay of the estimated road surface slope value in the certain convergence determination period (from t1 to t2) is greater than or equal to the certain value. Thus, it is determined that the vehicle is on momentarily rough terrain. Also, the detected forward/backward G converges. Therefore, the fixing of the estimated road surface slope value is released.

At time t3, the vehicle stops, and the conditions for initiating the stop-start control are met.

At time t4, the stop-start control is initiated, and the engine 1 is automatically stopped. Thus, even if the vehicle has passed through momentarily rough terrain immediately before the vehicle is stopped, the stop-start control may be performed immediately after the vehicle is stopped. Therefore, a reduction in fuel economy due to incorrect estimation of road surface slope caused by the vehicle passing through the momentarily rough terrain may be suppressed.

The case illustrated in FIG. 4B will now be described. At time t1, the vehicle enters rough terrain.

During the period from time t1 to time t2, the detected forward/backward G largely varies because the vehicle is moving on the rough terrain. Thus, the value obtained by subtracting the estimated forward/backward G from the detected forward/backward G oscillates, while the estimated road surface slope value is fixed to a value obtained immediately before the variation occurs, that is, the value obtained at time t1. Therefore, the stop-start control prohibition flag is not set.

At time t2, the rate of decay of the estimated road surface slope value in the certain convergence determination period (from t1 to t2) is less than the certain value. Thus, it is determined that the vehicle is on continuously rough terrain. Therefore, the fixing of the estimated road surface slope value is released, and a value obtained by subtracting the estimated forward/backward G from the detected forward/backward G is used as the estimated road surface slope value. Furthermore, since it is determined that the vehicle is on continuously rough terrain, the stop-start control prohibition flag is set.

At time t3, the vehicle stops. During the period from time t3 to time t4, the stop-start control prohibition flag is set and therefore the stop-start control is not performed.

When the vehicle is at rest on rough terrain, the precision for the estimation of road surface slope may be markedly low. In addition, the road surface μ may be presumably lower than the surface of paved terrain. If the stop-start control is performed, the vehicle may roll down the slope. By prohibiting the stop-start control when the vehicle is at rest on rough terrain, it may be possible to prevent the vehicle from rolling down a hill.

At time t4, the vehicle starts moving. At time t5, the vehicle travels a certain distance with the detected forward/backward G converging. Thus, the stop-start control prohibition flag is reset. When the vehicle is at rest, the detected forward/backward G converges even if the vehicle is on rough terrain. Thus, if the prohibition of automatic stopping of the engine 1 is released in response to the convergence of the detected forward/backward G, the vehicle may roll down the slope in a case where the vehicle has not exited the rough terrain. Therefore, by allowing automatic stopping of the engine 1 only when the vehicle has presumably exited the rough terrain, it may be possible to prevent the vehicle from rolling down a hill.

In addition to the advantages (1), (2), and (4) achievable by the first embodiment, the second embodiment may achieve the following advantages:

(5) An engine control apparatus including an engine control unit 10 that causes an engine 1 of a vehicle to automatically stop when certain initiation conditions including the condition that a slope of a road surface is less than or equal to a stop-start allowable slope when the vehicle is coasting are met, and thereafter causes the engine 1 to restart when certain termination conditions including the condition that a slope of the road surface is larger than the stop-start allowable slope are met determines whether or not to execute stop-start control, based on the estimated road surface slope value obtained by the road surface slope estimating device 10b. Since the stop-start control is not prohibited even when the vehicle is traveling on momentarily rough terrain, a reduction in fuel economy due to incorrect estimation of road surface slope may be suppressed.

(6) When the convergence of the detected forward/backward G continues for a certain travel distance after it is determined that the vehicle is traveling on continuously rough terrain, the engine control unit 10 releases the prohibition of automatic stopping of the engine 1. Therefore, the vehicle may be prevented from rolling down a hill when the vehicle is at rest on rough terrain.

A third embodiment provides an example of an application to coast N idle control. Differences from the first embodiment will be described.

In the third embodiment, the engine control unit (idle control means) 10 performs coast N idle control for outputting a start clutch disengagement request to the CVT control unit 15 to disconnect the engine 1 from the drive wheels 4 when the vehicle is decelerating and presumably will stop, and for driving the engine 1 to idle.

The coast N idle control is initiated when all the following five conditions are met, and is terminated when any one of the following five conditions is not met:

(1) The amount of braking operation is greater than or equal to a certain amount.

(2) The amount of accelerator pedal operation is zero.

(3) The driving range is selected.

(4) The vehicle speed is less than or equal to a reference vehicle speed (vehicle speed at which the lock-up clutch is disengaged).

(5) The road surface slope is less than or equal to a coast N idle allowable slope (certain degree of slope).

Even though all the five conditions given above are met, the engine control unit 10 sets a coast N idle control prohibition flag when the vehicle is traveling on rough terrain (such as gravel or grass), and prohibits or cancels the coast N idle control as long as the prohibition flag is set. The prohibition flag is reset when the vehicle exits the rough terrain.

Figure 5A:
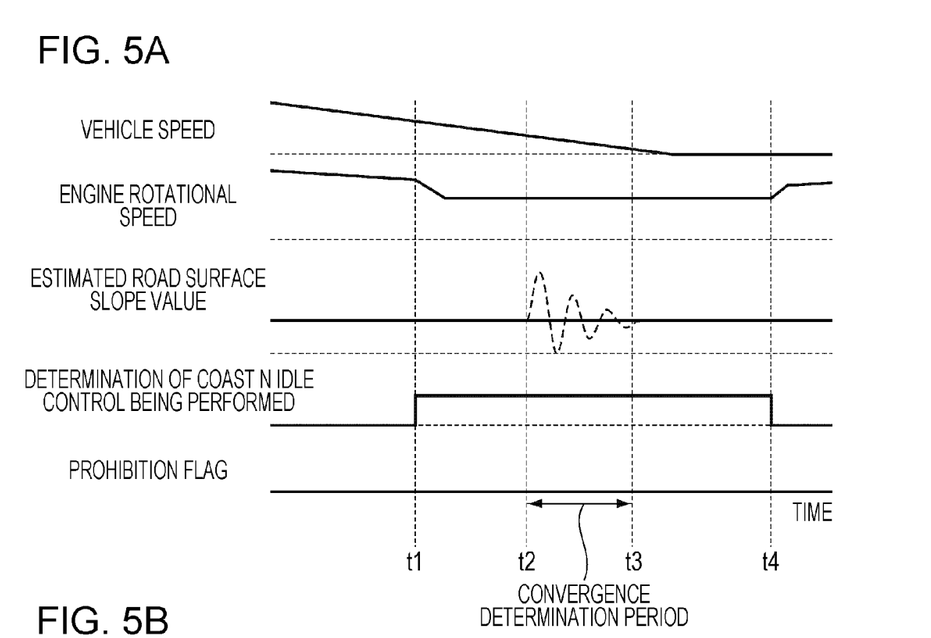
FIGS. 5A and 5B are time charts illustrating the operation of estimating a road surface slope according to a third embodiment.
Figure 5B:
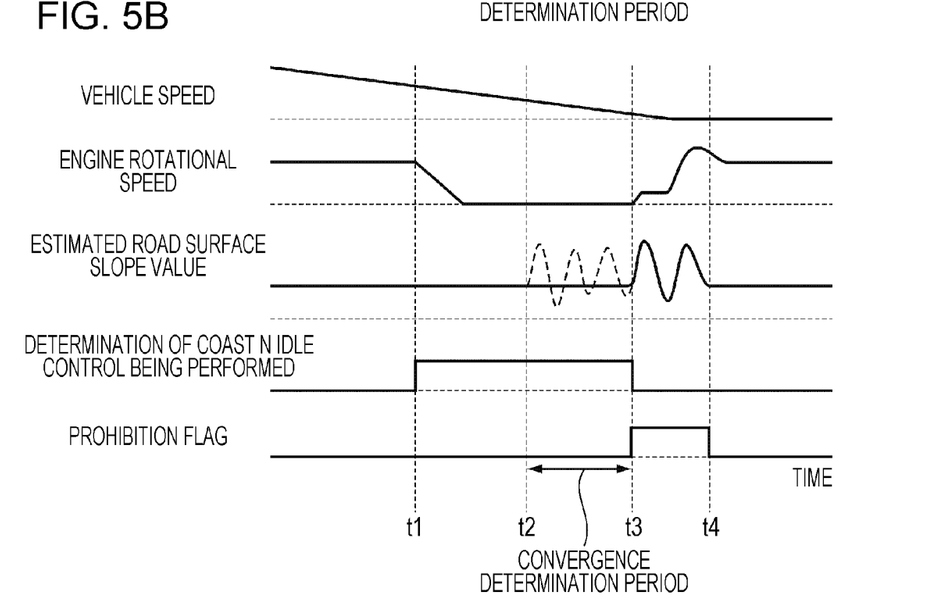

FIGS. 5A and 5B are time charts illustrating the operation of estimating a road surface slope according to the third embodiment. FIG. 5A illustrates the time chart in a case where the vehicle is traveling on momentarily rough terrain, and FIG. 5B illustrates the time chart in a case where the vehicle is traveling on rough terrain (continuously rough terrain).

First, the case illustrated in FIG. 5A will be described. At time t1, the conditions for initiating the coast N idle control are met. Thus, it is determined that coast N idle control is to be performed, and the engine 1 is disconnected from the drive wheels 4 and is driven to idle. At time t2, the vehicle is passing through momentarily rough terrain.

During a period from time t2 to time t3, the detected forward/backward G largely varies because the vehicle is passing through the momentarily rough terrain. Thus, the value obtained by subtracting the estimated forward/backward G from the detected forward/backward G oscillates in a manner indicated by a broken line while the estimated road surface slope value is fixed to a value obtained immediately before the variation occurs, that is, the value obtained at time t2. Therefore, the coast N idle control is not canceled and the engine 1 is continuously driven to idle. Therefore, a reduction in fuel economy due to incorrect estimation of road surface slope caused by the vehicle passing through the momentarily rough terrain may be suppressed.

At time t3, the rate of decay of the estimated road surface slope value in the certain convergence determination period (from t2 to t3) is greater than or equal to the certain value. Thus, it is determined that the vehicle is on momentarily rough terrain. Also, the detected forward/backward G converges. Therefore, the fixing of the estimated road surface slope value is released.

At time t4, the driver of the vehicle releases his or her foot from the brake pedal. Thus, the coast N idle control is canceled, and the engine 1 is connected to the drive wheels 4 to increase the engine rotational speed.

The case illustrated in FIG. 5B will now be described. The operation in the period from time t1 to time t2 is substantially the same as that illustrated in FIG. 5A, and a description thereof is thus omitted. At time t2, the vehicle enters rough terrain.

During the period from time t2 to time t3, the detected forward/backward G largely varies because the vehicle is moving on the rough terrain. Thus, the value obtained by subtracting the estimated forward/backward G from the detected forward/backward G oscillates, while the estimated road surface slope value is fixed to a value obtained immediately before the variation occurs, that is, the value obtained at time t2. Therefore, the coast N idle control is not canceled and the engine 1 is continuously driven to idle.

At time t3, the rate of decay of the estimated road surface slope value in the certain convergence determination period (from t2 to t3) is less than the certain value. Thus, it is determined that the vehicle is on continuously rough terrain. Therefore, the fixing of the estimated road surface slope value is released, and a value obtained by subtracting the estimated forward/backward G from the detected forward/backward G is used as the estimated road surface slope value. Furthermore, since it is determined that the vehicle is on continuously rough terrain, the coast N idle control prohibition flag is set. Therefore, the coast N idle control is canceled, and the engine 1 is connected to the drive wheels 4 to increase the engine rotational speed.

While the vehicle is traveling on rough terrain, the precision for the estimation of road surface slope may be markedly low. In addition, the road surface μ may be presumably lower than the surface of paved road. If the coast N idle control is performed, the vehicle may roll down the slope. Furthermore, the estimated road surface slope value varies over the coast N idle allowable slope, resulting in a risk that control hunting may occur. By prohibiting the coast N idle control when the vehicle is traveling on rough terrain, it may be possible to prevent the vehicle from rolling down a hill or control hunting from occurring.

At time t4, the estimated road surface slope value converges. Thus, the coast N idle control prohibition flag is reset.

In addition to the advantages (1) and (2) achievable by the first embodiment, the third embodiment may achieve the following advantages:

(7) An engine control apparatus including an engine control unit 10 that disconnects an engine 1 of a vehicle from drive wheels 4 to causes the engine 1 to idle when certain initiation conditions including the condition that a slope of a road surface is less than or equal to a coast N idle allowable slope when the vehicle is coasting are met, and thereafter causes the engine 1 to be connected to the drive wheels 4 when certain termination conditions including the condition that a slope of the road surface is larger than the coast N idle allowable slope determines whether or not to execute coast N idle control, based on the estimated road surface slope value obtained by the road surface slope estimating device 10b. Since the coast N idle control is not prohibited even when the vehicle is traveling on momentarily rough terrain, a reduction in fuel economy due to incorrect estimation of road surface slope may be suppressed.

(8) When it is determined that the vehicle is traveling on continuously rough terrain, the engine control unit 10 prohibits the engine 1 from being disconnected from the drive wheels 4 and the engine 1 from idling even if the initiation conditions are met. Therefore, the vehicle may be prevented from rolling down a slope or control hunting may be prevented from occurring when the vehicle is traveling on rough terrain.

While an apparatus for controlling automatic stopping and restarting of an engine according to some embodiments of the present invention has been described, the present invention is not limited to the foregoing configurations and any other configuration may be used without departing from the scope of the present invention.

For example, the foregoing embodiments provide an example in which if it is determined that a vehicle is traveling on momentarily rough terrain, an estimated road surface slope value is fixed to an estimated road surface slope value obtained immediately before the determination is made. However, any value with reduced influence of the vehicle passing through momentarily rough terrain may be used as the estimated road surface slope value.

Further, the foregoing embodiments provide an example in which the determination as to whether a vehicle is traveling on momentarily rough terrain or not or whether the vehicle has exited continuously rough terrain or not is based on changes in detected forward/backward G value and the convergence of the changes. Alternatively, the determination may be based on an estimated forward/backward G or a calculated value obtained by subtracting an estimated forward/backward G from a forward/backward G.

What is claimed is:

1. A road surface slope estimating device comprising:
    an acceleration detecting unit configured to detect a forward/backward acceleration of a vehicle; and
    a road surface slope estimating unit configured to calculate an estimated road surface slope value based on the detected forward/backward acceleration, wherein
    the road surface slope estimating unit comprises:
        a momentarily rough terrain determining unit configured to determine whether the vehicle is traveling on momentarily rough terrain or continuously rough terrain, wherein if the vehicle is traveling on momentarily rough terrain, the road surface slope estimating unit calculates the estimated road surface slope value with reduced influence of the vehicle passing through the momentarily rough terrain.

2. The road surface slope estimating device according to claim 1, wherein the momentarily rough terrain determining unit determines whether the vehicle is traveling on momentarily rough terrain or continuously rough terrain based on convergence of the detected forward/backward acceleration.

3. The road surface slope estimating device according to claim 1, wherein if the vehicle is travelling on continuously rough terrain, the estimated road surface slope value based on the detected forward/backward acceleration is used.

4. An engine control apparatus of a vehicle comprising:
    an automatic stop and restart control unit configured to cause an engine to automatically stop when initial conditions are met, the initiation conditions including a road surface slope less than or equal to a certain degree of slope when the vehicle is coasting or at rest, and thereafter configured to cause the engine to restart when the road surface slope is larger than the certain degree of slope;
    an acceleration detecting unit configured to detect a forward/backward acceleration of the vehicle; and
    a road surface slope estimating unit configured to calculate the road surface slope on the detected forward/backward acceleration, wherein the road surface slope estimating unit comprises:
        a momentarily rough terrain determining unit configured to determine whether the vehicle is traveling on momentarily rough terrain or continuously rough terrain, wherein if the vehicle is traveling on momentarily rough terrain, the road surface slope estimating unit calculates the estimated road surface slope value with reduced influence of the vehicle passing through the momentarily rough terrain.

5. The engine control apparatus according to claim 4, wherein, when it is determined that the vehicle is traveling on continuously rough terrain, the automatic stop and restart control unit prohibits automatic stopping of the engine even if the initial conditions are met.

6. The engine control apparatus according to claim 5, wherein, when convergence of the detected forward/backward acceleration continues for a certain travel distance, the automatic stop and restart control unit releases prohibition of the automatic stop.

7. An engine control apparatus of a vehicle comprising:
    an idle control unit configured to disconnect an engine from drive wheels to drive the engine to idle when initial conditions are met, the initial conditions including a road surface slope less than or equal to a certain degree of slope when the vehicle is coasting, and thereafter connecting the engine to the drive wheels when termination conditions are met, the termination conditions including the road surface slope being larger than the certain degree of slope; and
    an acceleration detecting unit configured to detect a forward/backward acceleration of the vehicle; and
    a road surface slope estimating unit configured to calculate the road surface slope on the detected forward/backward acceleration, wherein the road surface slope estimating unit comprises:
        a momentarily rough terrain determining unit configured to determine whether the vehicle is traveling on momentarily rough terrain or continuously rough terrain, wherein if the vehicle is traveling on momentarily rough terrain, the road surface slope estimating unit calculates the estimated road surface slope value with reduced influence of the vehicle passing through the momentarily rough terrain.

8. The engine control apparatus according to claim 7, wherein, when the vehicle is traveling on continuously rough terrain, the idle control unit prohibits the engine from being disconnected from the drive wheels and the engine from idling even if the initial conditions are met.

9. A road surface slope estimating device comprising:
    means for detecting a forward/backward acceleration of a vehicle; and
    means for calculating an estimated road surface slope value based on the detected forward/backward acceleration, the means for calculating the estimated road surface slope value comprising:
        means for determining whether the vehicle is traveling on momentarily rough terrain or continuously rough terrain, wherein if it is determined that the vehicle is traveling on momentarily rough terrain, the means for calculating the estimated road surface slope value calculates the estimated road surface slope value with reduced influence of the vehicle passing through the momentarily rough terrain.

* * * * *